United States Patent [19]

Levinsky et al.

[11] 4,199,547
[45] Apr. 22, 1980

[54] DEVICE FOR PRODUCING FOAM PLASTICS

[75] Inventors: Boris V. Levinsky; Viktor G. Pyatakov; Andrei A. Medunin; Vladimir A. Moskvitin, all of Irkutsk, U.S.S.R.

[73] Assignee: Irkutsky Gosudarstvenny NauchnoIssledovatelsky Institut Redkikh I Tsvetnykh Metallov "Irgiredmet", Irkutsk, U.S.S.R.

[21] Appl. No.: 859,795

[22] Filed: Dec. 12, 1977

[51] Int. Cl.² .................... B01J 8/00; B01F 5/00; B29D 27/00; C08J 9/00
[52] U.S. Cl. .................... 422/133; 366/165; 366/178; 366/182; 422/134; 422/135; 521/188; 521/917
[58] Field of Search ............ 23/252 R, 260, 285; 260/2.5 F; 366/165, 167, 177, 178, 182; 422/133, 134, 135; 252/359 R, 359 E

[56] References Cited

U.S. PATENT DOCUMENTS

| 2,761,882 | 9/1956 | Hulse et al. | 23/260 X |
|---|---|---|---|
| 2,764,565 | 9/1956 | Hoppe et al. | 23/252 R |
| 3,043,670 | 7/1962 | Vieli | 23/285 |
| 3,072,462 | 1/1963 | Anderson | 23/252 R |
| 3,238,021 | 3/1966 | Webber et al. | 23/252 R |
| 3,256,067 | 6/1966 | Shriver et al. | 23/260 |
| 3,424,439 | 1/1969 | Baker | 23/252 R |
| 3,486,862 | 12/1969 | Unterstenhoefer | 23/285 |
| 3,856,269 | 12/1974 | Fothergill et al. | 366/165 |

Primary Examiner—Joseph Scovronek
Attorney, Agent, or Firm—Lackenbach, Lilling & Siegel

[57] ABSTRACT

The present invention relates to a method for producing foam plastics and a device for effecting same. The method resides in foaming with continuous and proportioned injection of all components successively in two stages, mixing water, resin and a foaming agent under pressure with compressed air to obtain homogenized foam with a foam coefficient of 15 to 20, with subsequent injection thereinto of a curing catalyst together with compressed air. The device for carrying out the proposed method comprises proportioners the inlets whereof are connected to tanks each being intended for a respective component, as well as curing and foaming chambers communicating through two closely adjacent coaxially arranged pipes forming an annulus, the outer pipe being provided with diametrically oposite connections for letting into the annulus the catalyst and compressed air. Said method and device provide for continuous mixing of the components and simultaneous introduction of the catalyst and compressed air into the foam, which considerably improves the degree of homogeneity of foam plastic structure.

2 Claims, 3 Drawing Figures

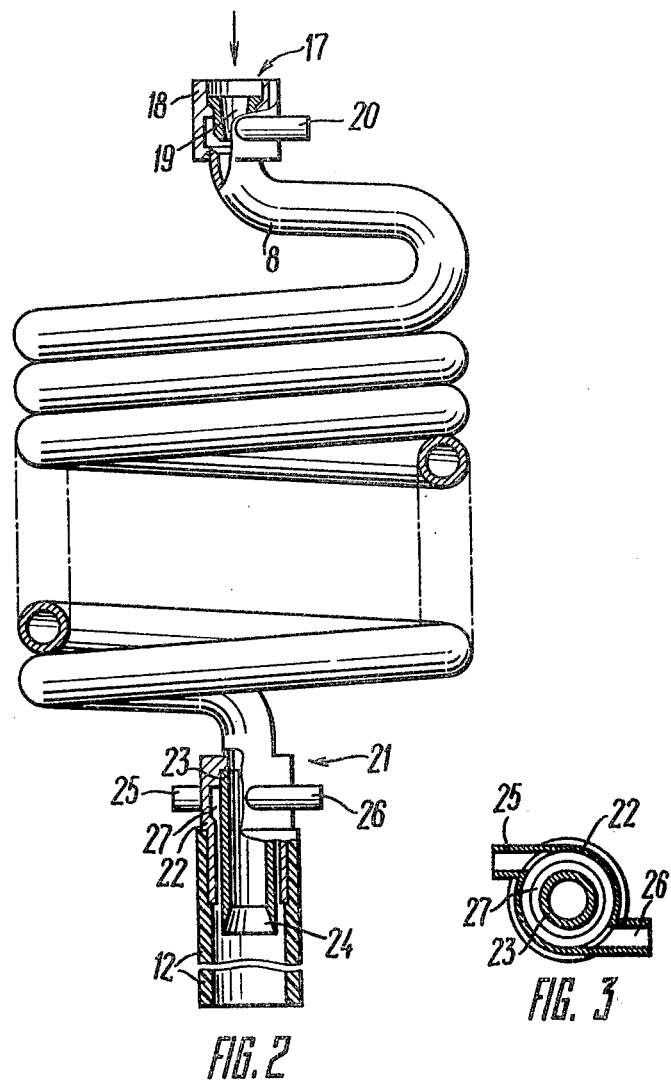

DEVICE FOR PRODUCING FOAM PLASTICS

The present invention relates to the production of foam plastics such as urea-formaldehyde resin, used for heat insulation of soil at proving grounds and quarries, as well as for warming structures, concrete elements, brickworks and pipelines.

Known in the art are methods for producing urea-formaldehyde foam plastics, comprising two periodically repeated operations: preparation of the working solutions of components and their foaming. Usually two working solutions are prepared: in one case, an aqueous solution including a curing catalyst and a foamer and a resin solution, in another case, a resin solution with a foamer and a curing catalyst solution.

According to prior art methods, both working solutions are mixed with simultaneous injection of compressed air until foam is obtained or one of the solutions is foamed and the other is introduced into the obtained foam.

As a rule, better results are achieved when the resin solution with the foamer is foamed in advance and the obtained foam is cured with a catalyst solution. This is due to the fact that, firstly, in this case the curing catalyst, having the highest diffusion rate of all the components, is introduced at the last stage and, secondly, it is introduced into the already formed foam, which prevents sedimentation of the polymer particles and, consequently, formation of crust on the surface contacting the foam.

The prior art methods suffer from a number of disadvantages.

(1) The process of obtaining the foam is cyclic, comprising two consecutively repeated operations, namely: preparation of the working solutions and their foaming. Provision of a second solution section with a view to minimizing the process idle time leads to an increase of the unit dimensions and, consequently, to a reduction of its specific capacity.

(2) The premixing of the components rules out the possibility of controlling the foam plastic quality during the process.

(3) The introduction of a curing catalyst immediately prior to the prepared foam coming out of the foam generator does not provide for reliable mixing, which deteriorates the homogeneous cellular structure of the foam plastic. This results in a poorer mechanical strength which has to be equalized by increasing the foam plastic bulk.

The devices for carrying out these methods comprise tanks for preparing the working solutions, equipped with agitators, pumps for feeding the working solutions, a compressor as a source of compressed air, and communicating foaming and curing chambers provided with inlet pipes for the solutions and compressed air. Besides, the resin tank should be furnished with an agitator capable of keeping the resin particles suspended.

The disadvantages of the known device are:

(1) the use of diluted component solutions (38% resin solution, 8% orthophosphoric acid solution), which requires additional equipment for their preparation;

(2) in the device, the cross section of the curing chamber is not larger than that of the foaming chamber. Therefore, as the curing agent solution, constituting from 50 to 60% of the total volume of the composition being foamed is being introduced, the resistance to the foam movement sharply increases, which necessitates either a great pressure differential or shortening the curing chamber, thereby adversely affecting the mixing conditions and rendering it impossible to deliver the foam to the user;

(3) the introduction of the curing agent directly through the nozzle usually leads to formation of a polymer crust on its inner surface and makes it necessary to frequently stop the device for cleaning;

(4) the device is designed to obtain light foam in the foaming chamber. Thus, for instance, in order to obtain foam with a foam coefficient of 30 at the curing chamber outlet, the foaming agent solution must be preformed to a coefficient of 70. This is achieved through high consumption of the foaming agent (to 10% of the composition weight). Consequently, the necessity of high consumption of the foaming agent is another disadvantage of the prior art device.

It is an object of the present invention to provide a method for producing foam plastics and a device for effecting same, providing for a continuous process of mixing and foaming the components.

Another object of the invention is to enhance the degree of homogenizing the foam plastic structure.

Still another object of the invention is to increase the efficiency of the device.

Yet another object of the invention is to increase the foam coefficient.

These and other objects are accomplished in a method for producing foam plastics, by dissolving urea-formaldehyde resin and foaming the resulting solution with compressed air, with subsequent introduction of a curing catalyst into the foam. According to the invention, the foaming stage is conducted with continuous and proportioned injection of all the components successively in two stages, mixing water, the resin and a foaming agent under pressure with compressed air to obtain homogenized foam with a foam coefficient of 15 to 20, with subsequent injection thereinto of the curing catalyst together with compressed air, which is taken in an amount required to increase the foam coefficient to 25–40.

For carrying out the method of the invention use is made of a device comprising communicating chambers for foaming the components fed by pumps and for curing the foam, as well as a compressor for compressed air. The device according to the invention is provided with proportioners the inlets whereof are connected to tanks, each being intended for a respective component, and the chambers for foaming and curing communicate through two coaxially arranged pipes closely adjacent to the chambers and forming an annulus, the outer pipe having connections for letting in a curing catalyst and compressed air, arranged diametrically opposite to each other so as to provide for dispersion of the curing catalyst.

Due to the continuous and proportioned injection of all the components contained in separate tanks, associated with the delivery pump through the proportioners, it is possible to use the components in question in their original form, without preparing the working solutions in advance. This permits producing foam plastics in a continuous process and increasing the equipment efficiency.

Two-stage foaming makes it possible to obtain sufficiently light foam at high (up to 10 m/sec and higher) flow rates. Besides, the possibility of maintaining, at the first stage of foaming, a foam coefficient of 15 to 20 prevents polymer particles from settling out in the curing chamber, as in this case the curing catalyst is supplied into a formed cellular structure having a high viscosity. The above foam coefficient limits are due to the fact that in foams with a coefficient below 15, partial sedimentation of polymer particles is possible, while in the case of foams with a coefficient above 20 no improvement in the end product quality is observed, whereas the optimum composition or the process have to be altered. Sedimentation of polymer particles on the curing chamber walls is also prevented by the catalyst being finely dispersed as it contacts the foam. This is ensured by the manner in which the foaming and curing chambers communicate by means of two coaxially arranged pipes closely adjacent to the chambers and forming an annulus. The introduction into the cavity of compressed air and the catalyst tangentially from diametrically opposite directions, results in a vortex of air, carrying small drops of the curing catalyst. This vortex, interacting with the foam flowing from the foaming chamber, causes turbulence of the latter, resulting in additional foaming to a foam coefficient of 25 to 40. The final value of the foam coefficient depends on the viscosity of the composition being foamed which, in turn, depends on the resin content. The proposed method and device provide for a foam coefficient of 25 even at high (up to 50%) resin consumption. With the reduction of the resin content in the composition, the foam coefficient, all other things being equal, increases and, at a resin content of 15 to 25%, it may become as high as 40.

Further increase in the foam coefficient is not expedient since it is difficult to keep the obtained foam on a surface to be warmed, due to its low density.

The mixing of the foam coming out of the foaming chamber with the vortex of air and the catalyst introduced into the curing chamber does not, at the initial moment, result in the formation of bubbles approximately equal in size. Further homogenizing of the obtained foam requires its mixing for at least 4 sec.

According to the invention, the foaming process is conducted with the gas-liquid mixture moving through the cylindrical passages of the chambers, with turbulence. In this case, the foam quality is determined by the foam flow rate and the time of its residence in each chamber. The optimum flow rate ranges from 5 to 12 m/sec, and the minimum time interval necessary for homogenizing the foam is 2.5 to 3 sec in the foaming chamber and 4 sec in the curing chamber.

When 20 to 200 m³ of foam are produced per hour, these conditions are met with the ratio of the chamber length to its diameter being, for the foaming chamber, 500 to 800 and, for the curing chamber, no less than 600. For the curing chamber, the upper limit of this ratio is not specified on purpose for, with a view to delivering the foam to the user, the length of the chamber made of a rubber-fabric, canvas or capron hose may reach 120 to 150 m.

In order to ensure reliable operation of the whole device, the foam flow rate in the curing chamber should be somewhat lower than or equal to the flow rate in the foaming chamber. This is achieved through the ratio between the cross-sections of the chambers, equalling 1.6 to 3. These limits permit meeting the above condition in the range of foam coefficients of 15-20 to 25-40, in the foaming chamber and in the curing chamber, respectively.

Besides, it should be noted that the premixing of the curing catalyst with air and spraying make it possible to use the catalyst in a concentrated form, thus eliminating the operation of dissolving it, and the end of the inner pipe, adjoining the foaming chamber, facing the curing chamber in the form of diffuser with sharp edges facilitates the interaction of the axial foam flow with the vortex of the sprayed catalyst.

The invention will now be described with reference to specific examples of its implementation, taken in conjunction with the appended drawings, wherein:

FIG. 2 shows the foaming and curing chambers;

FIG. 3 shows the arrangement of the connections for letting the curing catalyst and compressed air into the annulus.

Figure 1:
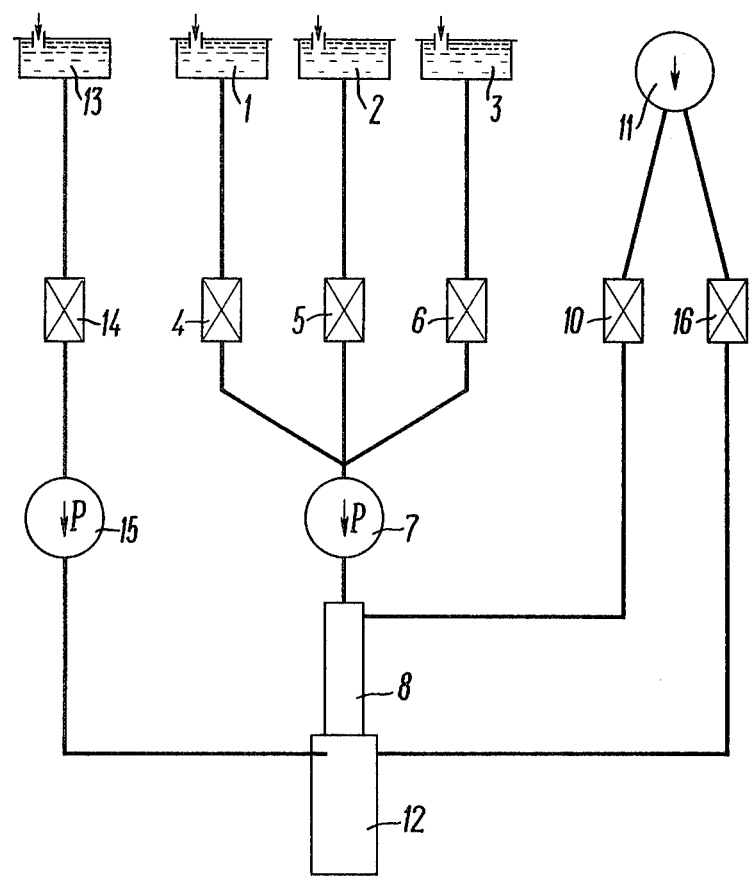
FIG. 1 is a basic flow diagram of the proposed method.

The proposed method resides in the following.

Water from a tank 1 (FIG. 1), resin from a tank 2 and a foaming agent from a tank 3 are fed, through respective proportioners 4, 5, and 6 providing for the following weight ratios of said components: 50–82; 15–50; and 1–5 by a pump 7 into a foaming chamber 8 which also receives, through a proportioner (for instance, a differential manometer) 10 from a compressor 11, compressed air in an amount necessary for obtaining foam with a foam coefficient of 15 to 20. As the gas-liquid mixture moves through the passage of the foaming chamber in a turbulent flow at a rate of 8 to 12 m/sec, there takes place mutual dissolution of the mixture of liquid components together with air dispersion, accompanied by a gradual increase in the foam coefficient and the degree of homogenization. At least 2.5 to 3 seconds later the foam coefficient at the foaming chamber outlet reaches 15 to 20, and bubbles differ in size but insignificantly. From the foaming chamber, the homogenized foam enters a curing chamber 12 which also receives a curing catalyst from a tank 13 through a proportioner 14 and a pump 15, as well as compressed air, through a proportioner 16 from the compressor 11, in an amount necessary to obtain foam of a desired foam coefficient, within the range of 25 to 40.

The curing catalyst and air, introduced into the curing chamber, are premixed and, as a vortex, interact with the axial foam flow. At the same time, turbulization of the whole flow occurs, causing the sprayed catalyst to dissolve faster and the introduced air to disperse. The dissolution of the catalyst starts the initial stage of foam curing, or gelatinization (gel formation), whereat the films are still sufficiently mobile and air bubbles are capable of homogenization which takes at least 4 seconds.

The gelatinized foam with a foam coefficient of 25 to 40, obtained at the curing chamber outlet, is applied onto a surface to be warmed in a layer of a desired thickness (with due account for its drying shrinkage) and, as a result of natural drying, turns to a foam plastic featuring the following properties:

| 1. Bulk, kg/m³ | 5–15 |
| 2. Drying shrinkage, % | 5–20 |
| 3. Thermal conductivity coefficient, kcal/m.hour.deg | 0.023–0.032 |
| 4. Moisture absorption, kg/m³ | 0.5–10. |

In the device for carrying out the proposed method, the foaming chamber 8 (FIG. 2) comprises a head 17 of the foaming chamber, including a casing 18, a nozzle 19 and a tangential air inlet 20. The foaming chamber 8 is made as a hollow coil with a ratio of its length to the diameter of 500 to 800, and its end is connected to a head 21 of the curing chamber 12. The head 21 of the curing chamber 12 includes two coaxially arranged pipes, of which an outer pipe 22 closely adjoins the curing chamber 12, and an inner pipe 23 closely adjoins the foaming chamber 8 and terminates in a diffuser 24. The outer pipe 22 has a connection 25 for introducing the curing catalyst and a connection 26 for introducing compressed air. Said connections are arranged in a manner shown in FIG. 3. At the point of introduction of the curing catalyst and air through the connections 25 and 26, respectively, the outer pipe 22 and the inner pipe 23 form an annulus 27 narrowing towards the outlet, into the curing chamber 12 made as a flexible hose with a ratio of its length to the diameter of no less than 600.

EXAMPLE 1

Urea-formaldehyde resin (65% of solid residue), at a rate of 200 l/hr (25 wt.%), a foaming agent (an aqueous solution of sodium alkylarylsulfonate, containing 37% of the active agent), at a rate of 25 l/hr (2.5 wt.%), and water, at a rate of 700 l/hr (70 wt.%) are continuously injected from separate tanks into the foaming chamber at a pressure of 4.2 to 4.4 atm, which also receives air at the same pressure, at a rate of 20 m$^3$/hr (n.c.). The foaming chamber is made of a hose 20 m long with an inner diameter of 25 mm and in the form of a hollow coil. The foam, moving along the passage of the chamber, features a foam coefficient of 20 and enters the curing chamber having an inner diameter of 32 mm and a length of 30 m, which also receives the curing catalyst delivered by a metering pump, the catalyst being concentrated orthophosphoric acid (density, 1.7), at a rate of 15 l/hr (2.5 wt.%) and air at a rate of 20 m$^3$/hr. Besides, additional foaming and gelatinization of the foam take place, the foam acquiring a foam coefficient of 40 at the curing chamber outlet. The foam was applied onto the surface of a building unit to be warmed, where it turned after drying to a foam plastic featuring the following properties:

| | |
|---|---|
| bulk, kg/m$^3$ | 5.0–5.2 |
| drying shrinkage, % | 20 |
| thermal conductivity coefficient, kcal/m.hr.deg | 0.023–0.026 |
| moisture absorption, kg/m$^3$ | 5–12. |

EXAMPLE 2

The same components as in Example 1 are foamed under the following conditions:

| | | |
|---|---|---|
| (1) | resin | 300 l/hr (17.8 wt. %), |
| (2) | foaming agent | 20 l/hr (1 wt. %), |
| (3) | water | 1,665 l/hr (80 wt. %), |
| (4) | orthophosphoric acid | 15 l/hr (1.2 wt. %), |
| (5) | air consumption by the foaming chamber (n.c.) | 30 m$^3$/hr |
| (6) | foam coefficient at stage 1 | 15, |
| (7) | air consumption by the curing chamber | 25 m$^3$/hr, |
| (8) | foam coefficient at stage 2 | 25, |
| (9) | foaming chamber length | 20 m, |
| (10) | foaming chamber inner diameter | 32 mm, |
| (11) | curing chamber length | 40 m, |
| (12) | curing chamber inner diameter | 50 mm. |

The obtained foam was applied onto ground with a view to warming it and, after natural drying, there was obtained a layer of foam plastic featuring the following properties.

| | |
|---|---|
| bulk, in a dry state, kg/m$^3$ | 5.4–5.6 |
| drying shrinkage, % | 15, |
| thermal conductivity coefficient, kcal/m.hr.deg | 0.025–0.030 |
| moisture absorption, kg/m$^3$ | 4–10. |

EXAMPLE 3

The same components as in Examples 1 and 2 are foamed under the following conditions:

| | | |
|---|---|---|
| (1) | resin | 1,000 l/hr (20 wt. %), |
| (2) | foaming agent | 100 l/hr (1.6 wt. %), |
| (3) | water | 4,800 l/hr (76.8 wt. %), |
| (4) | orthophosphoric acid | 60 l/hr (1.6 wt. %), |
| (5) | air consumption by the curing chamber | 90 m$^3$/hr, |
| (6) | foam coefficient at stage 1 | 15, |
| (7) | air consumption by the curing chamber (n.c.) | 90 m$^3$/hr, |
| (8) | foaming chamber length | 20 m, |
| (9) | foaming chamber inner diameter | 40 mm, |
| (10) | curing chamber length | 120 m, |
| (11) | curing chamber inner diameter | 70 mm. |

The foam obtained at the outlet at a rate of 180 m$^3$/hr was applied onto ground to be mined in winter and, after natural drying, there was obtained a layer of foam plastic featuring the following properties:

| | |
|---|---|
| bulk, kg/m$^3$ | 5.6–5.8 |
| drying shrinkage, % | 16 |
| thermal conductivity coefficient, kcal/m.hr.deg | 0.027–0.030 |
| moisture absorption, kg/m$^3$ | 3–8. |

EXAMPLE 4

The same components as in Examples 1–3, were foamed under the conditions of Example 1, but the curing chamber length was 20 m. The foam obtained at the outlet had a foam coefficient of 30 and the foam plastic featured the following properties:

| | |
|---|---|
| bulk, kg/m$^3$ | 6.0–6.2 |
| drying shrinkage, % | 10 |
| thermal conductivity coefficient, kcal/m.hr.deg | 0.027–0.030 |
| moisture absorption, kg/m$^3$ | 3–6. |

EXAMPLE 5

A foam plastic was obtained as described in Example 3, at the following ratio between the components, wt.%:

| | |
|---|---|
| resin | 25 |
| foaming agent | 2.5 |
| orthophosphoric acid | 1.5 |
| water | balance. |
| Total consumption | 6 m³/hr. |

At a foam coefficient of 30, there was obtained a foam plastic featuring the following properties:

| | |
|---|---|
| bulk, kg/m³ | 6.2–6.4 |
| drying shrinkage, % | 10 |
| thermal conductivity coefficient, kcal/m.hr.deg. | 0.028–0.030 |
| moisture absorption, kg/m³ | 3–6. |

EXAMPLE 6

A foam plastic was obtained as in Example 4, at the following ratio between the components, wt.%.

| | |
|---|---|
| resin | 50 |
| foaming agent | 4 |
| orthophosphoric acid | 4 |
| water | balance. |
| Total consumption | 1 m³/hr. |

The obtained foam with a foam coefficient of 25 was used for warming building units. The foam plastic featured the following properties:

| | |
|---|---|
| bulk, kg/m³ | 15 |
| drying shrinkage, % | 3 |
| thermal conductivity coefficient, kcal/m.hr.deg. | 0.030–0.032 |
| moisture absorption, kg/m³ | 0.5–1. |

What is claimed is:

1. An apparatus for producing urea-formaldehyde foam plastics, comprising: separate tanks for urea-formaldehyde resin, water, foaming agent and curing catalyst; proportioners for each tank, the inlets whereof connected to said tanks; a first pump connected to the outlets of the proportioners for the resin, foaming agent and water, for delivery of said components to a foaming chamber; a second pump connected to the outlet of the proportioner for the catalyst, for the delivery thereof to a curing chamber; said foaming chamber to receive the resin, water and foaming agent delivered by the first pump; said curing chamber to receive the curing catalyst delivered by the second pump; two coaxially arranged pipes, inner and outer, forming an annulus; said inner pipe adjoining the foaming chamber and communicating with the curing chamber; said outer pipe communicating with the foaming chamber and adjoining the curing chamber; the cross section of the curing chamber with the adjoining outer pipe being 1.6 to 3 times that of the foaming chamber; the ratio of the chamber length and its diameter being 500 to 800 for the foaming chamber and no less than 600 for the curing chamber; connections on said outer pipe arranged diametrically opposite each other to allow entry of the curing catalyst into the annulus; a compressor and proportioners for feeding compressed air into the foaming chamber and for feeding compressed air into the curing chamber, resulting in dispersion of the curing catalyst in the foam.

2. A device according to claim 1, wherein the end of the inner pipe, facing the curing chamber, is made in the form of a diffuser.

* * * * *